United States Patent
Michielin et al.

(10) Patent No.: US 11,074,752 B2
(45) Date of Patent: Jul. 27, 2021

(54) METHODS, DEVICES AND COMPUTER PROGRAM PRODUCTS FOR GRADIENT BASED DEPTH RECONSTRUCTIONS WITH ROBUST STATISTICS

(71) Applicant: SONY CORPORATION, Tokyo (JP)

(72) Inventors: Francesco Michielin, Stuttgart (DE); Roderick Köehle, Munich (DE); Fredrik Mattisson, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/971,105

(22) PCT Filed: Feb. 23, 2018

(86) PCT No.: PCT/US2018/019331
§ 371 (c)(1),
(2) Date: Aug. 19, 2020

(87) PCT Pub. No.: WO2019/164497
PCT Pub. Date: Aug. 29, 2019

(65) Prior Publication Data
US 2021/0012568 A1    Jan. 14, 2021

(51) Int. Cl.
*G06T 17/00*    (2006.01)
*G06T 17/20*    (2006.01)
(Continued)

(52) U.S. Cl.
CPC ............ *G06T 17/20* (2013.01); *G06T 3/0093* (2013.01); *G06T 5/20* (2013.01); *G06T 7/55* (2017.01); *G06T 2200/08* (2013.01)

(58) Field of Classification Search
None
See application file for complete search history.

(56) References Cited

U.S. PATENT DOCUMENTS 7,561,620 B2 *   7/2009   Winder ................. H04N 19/17
                                             375/240.12
7,778,451 B2 *   8/2010   Matsumoto ............ G06T 15/08
                                             382/128
(Continued)

FOREIGN PATENT DOCUMENTS

GB          2389500          12/2003

OTHER PUBLICATIONS

International Preliminary Report on Patentability, corresponding to International Application No. PCT/US2018/019331, dated Sep. 3, 2000, 8 pgs.
(Continued)

*Primary Examiner* — Martin Mushambo
(74) *Attorney, Agent, or Firm* — Myers Bigel, P.A.

(57) ABSTRACT

A method of generating a refined depth map for a three-dimensional (3D) model of an object is described. The method may include may include warping a set of target images, resulting in warped target images, wherein the set of target images is selected from the plurality of images; determining a difference between each warped target image and a reference image, wherein the reference image is from the plurality of images; determining, for each warped target image, an alpha mask comprising per-pixel weights; and updating an initialized depth map based on alpha mask, resulting in the estimated depth map. Related systems, devices and computer program products are also described.

20 Claims, 14 Drawing Sheets

(51) Int. Cl.
*G06T 7/55* (2017.01)
*G06T 3/00* (2006.01)
*G06T 5/20* (2006.01)

(56) References Cited

U.S. PATENT DOCUMENTS

| | | | | |
|---|---|---|---|---|
| 8,682,053 B2* | 3/2014 | Schneider | | G06T 15/08 |
| | | | | 382/131 |
| 8,761,457 B1* | 6/2014 | Seitz | | G06T 3/0093 |
| | | | | 382/113 |
| 9,881,207 B1* | 1/2018 | Nguyen | | G06K 9/4652 |
| 9,942,481 B2* | 4/2018 | Venshtain | | H04N 5/23296 |
| 9,953,223 B2* | 4/2018 | Lin | | G06T 7/187 |
| 2002/0089500 A1* | 7/2002 | Jennings, Jr. | | G06F 3/0484 |
| | | | | 345/420 |
| 2002/0190980 A1* | 12/2002 | Gerritsen | | G06T 19/00 |
| | | | | 345/419 |
| 2004/0125103 A1* | 7/2004 | Kaufman | | G06T 15/40 |
| | | | | 345/419 |
| 2005/0190189 A1* | 9/2005 | Chefd'hotel | | G06T 7/30 |
| | | | | 345/501 |
| 2006/0002626 A1* | 1/2006 | Matsumoto | | G06T 3/0037 |
| | | | | 382/276 |
| 2006/0056675 A1* | 3/2006 | Verdonck | | G06T 11/008 |
| | | | | 382/132 |
| 2006/0238534 A1* | 10/2006 | Matsumoto | | G06T 19/00 |
| | | | | 345/420 |
| 2008/0062164 A1* | 3/2008 | Bassi | | H04N 9/3194 |
| | | | | 345/214 |
| 2009/0184943 A1* | 7/2009 | Gross | | G06F 3/0386 |
| | | | | 345/175 |
| 2012/0183238 A1 | 7/2012 | Savvides et al. | | |
| 2013/0124148 A1 | 5/2013 | Jin et al. | | |
| 2013/0163854 A1* | 6/2013 | Cheng | | H04N 13/261 |
| | | | | 382/154 |
| 2014/0340404 A1* | 11/2014 | Wang | | G06T 19/006 |
| | | | | 345/427 |
| 2016/0140744 A1* | 5/2016 | Strelow | | G06T 11/60 |
| | | | | 382/284 |
| 2017/0206689 A1* | 7/2017 | Eo | | H04N 9/646 |
| 2017/0243351 A1* | 8/2017 | Li | | G06T 3/0068 |
| 2017/0287184 A1* | 10/2017 | Pettersson | | G06T 3/0093 |
| 2017/0347088 A1* | 11/2017 | Barron | | H04N 5/357 |
| 2018/0025496 A1 | 1/2018 | Lindner et al. | | |
| 2018/0315170 A1* | 11/2018 | Mills | | G06T 1/60 |
| 2018/0336737 A1* | 11/2018 | Varady | | G06T 7/62 |
| 2018/0350134 A1* | 12/2018 | Lodato | | G06T 15/20 |
| 2019/0108615 A1* | 4/2019 | Bartels | | G06T 5/50 |

OTHER PUBLICATIONS

International Search Report, corresponding to International Application No. PCT/US2018/019331, dated May 23, 2018, 2 pgs.

* cited by examiner

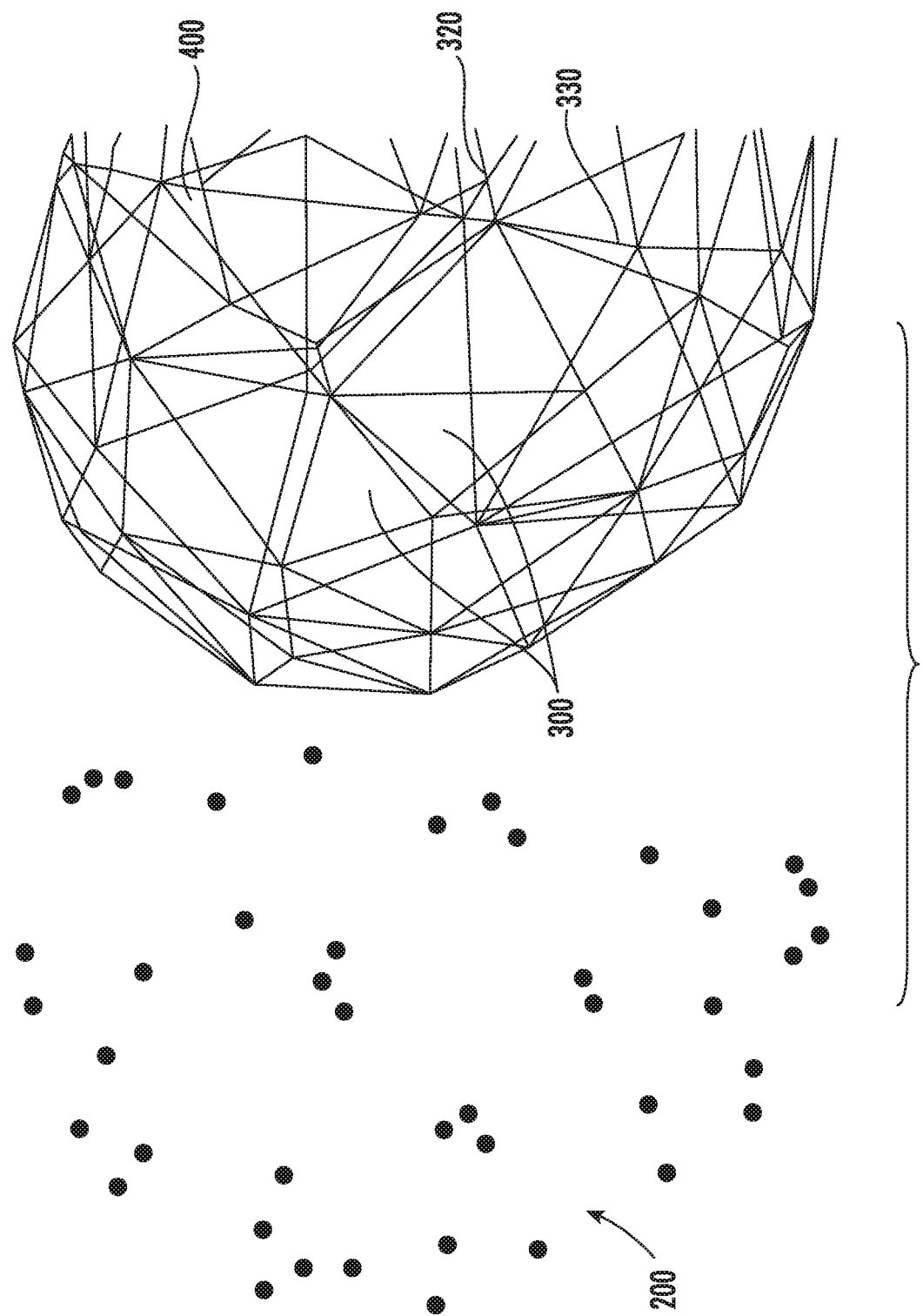

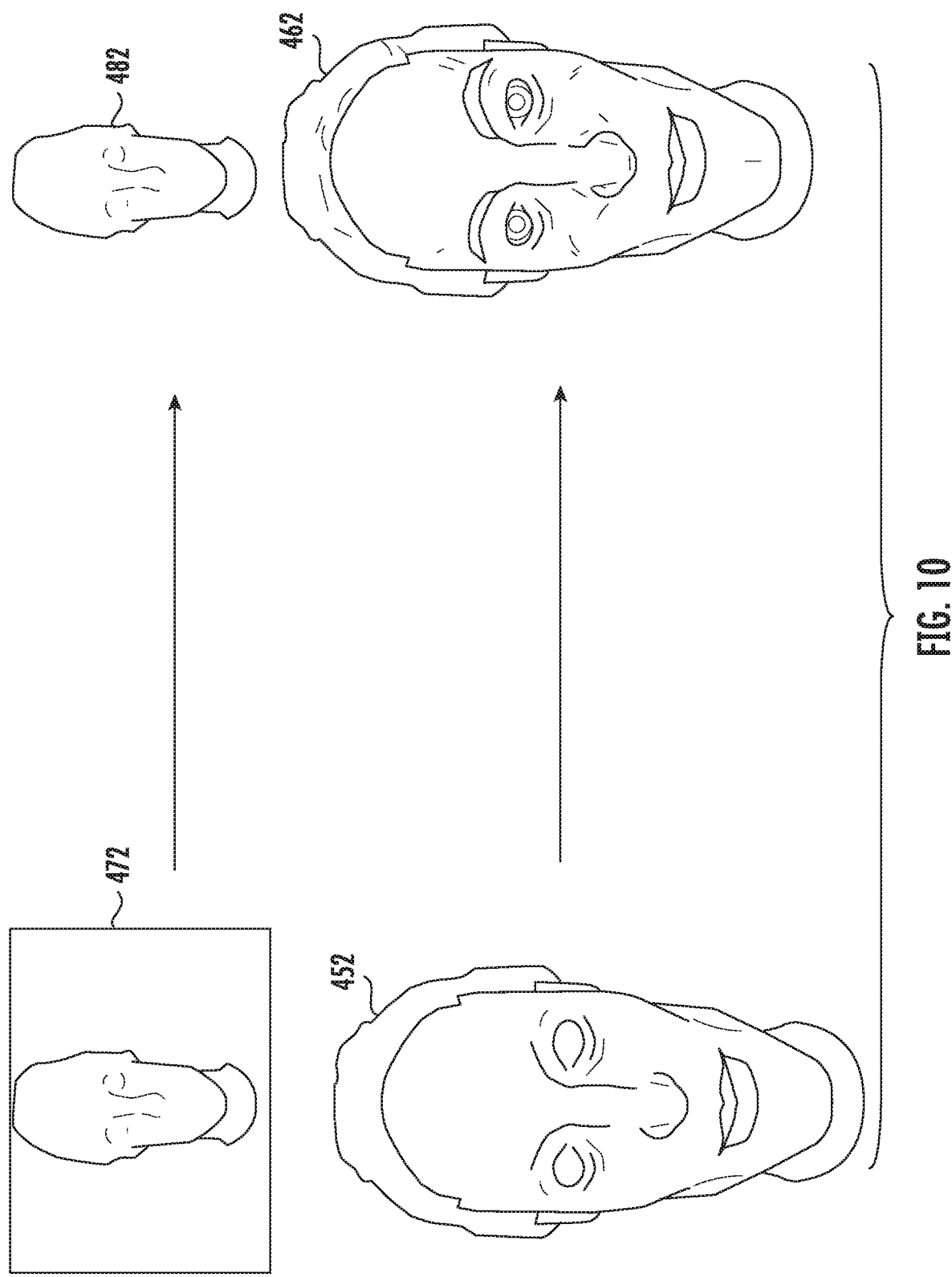

METHODS, DEVICES AND COMPUTER PROGRAM PRODUCTS FOR GRADIENT BASED DEPTH RECONSTRUCTIONS WITH ROBUST STATISTICS

CROSS-REFERENCE TO RELATED APPLICATION

This application is a 35 U.S.C. § 371 national stage application of PCT International Application No. PCT/US2018/019331, filed on Feb. 23, 2018, the content of which is incorporated by reference herein in its entirety. The above-referenced PCT International Application was published in the English language as International Publication No. WO 2019/164497 A1 on Aug. 29, 2019.

FIELD

The present disclosure relates to image processing, and more particularly, to methods and devices for three-dimensional (3D) modeling.

BACKGROUND 3D modeling may be used to create a representation of an object for use in a variety of applications, such as augmented reality, 3D printing, 3D model development, and so on. A 3D model may be defined by a collection of points in 3D space connected by various geometric entities such as triangles, lines, curved surfaces, or the like. One potential way to generate a 3D model of an object is via 3D scanning of the object. Although there are various methods to perform 3D scanning, one area of potential growth and development includes capturing a set of two-dimensional (2D) images by an image capture device. A collection of points in 3D space may be determined from corresponding feature points in the set of 2D images. A mesh representation (e.g., a collection of vertices, edges, and faces representing a "net" of interconnected primitive shapes, such as triangles) that defines the shape of the object in three dimensions may be generated from the collection of points. Refinements to the mesh representation may be performed to further define details.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of present inventive concepts.

The mapping of a 3D world from a set of 2D images has many challenges. One difficulty is determining a distance (or depth) from the image capture device to the object which is being scanned. Accordingly, dense estimation may be a part of a mesh representation generation or refinement process, and a part of a dense estimation may be the creation or improvement of a depth map. A depth map for a given image may be used, in combination with the intrinsic and extrinsic parameters of the image capturing device, in the generation of the collection of points (or a point cloud), which are in turn used in creating the mesh representation for an object.

Known methods for estimating the depth to an object from a captured image, or from a set of captured images, have been determined by the inventors to have inadequacies. Common problems are specular highlights and locomotion of the object. For example, during the image capturing process, light may reflect off of surfaces of an object (such as a person's skin, especially in the forehead area) and this may be captured in the data as a brightly lit specular highlight. As another example, while a person is being 3D scanned (that is, while a sequence of images is being captured of the person), the person may blink or slightly move their head. These sources of error may interfere with the mesh generation process. More particularly, these sources of error may interfere with the generation or refinement of the depth map, which may result in a point cloud having errors. Optimizations to the methods and algorithms used to generate and refine the depth map to reduce the impact of such sources of potential error are provided herein.

The present disclosure provides devices, computer program products, and methods for creating or refining a depth map for a digital three-dimensional model based on captured image data including a plurality of images, and based on an initial generated mesh. For example, one general aspect provides a method of generating a refined depth map for a three-dimensional (3D) model of an object, based on captured image data of the object comprising a plurality of images. The method may include warping a set of target images, resulting in warped target images, wherein the set of target images is selected from the plurality of images; determining a difference between each warped target image and a reference image, wherein the reference image is from the plurality of images; determining, for each warped target image, an alpha mask comprising per-pixel weights; and updating an initialized depth map based on alpha mask, resulting in the estimated depth map. In some implementations, the method may further include: initializing the initialized depth map (which may be based on a mesh representation of the object); determining an interpolation grid based on the initialized depth map. In some implementations, computing an update increment may be based at least in part on the determined alpha masks, and updating the initialized depth map may be based on the computed update increment. Other embodiments of this aspect include corresponding computer systems, apparatus, and computer programs recorded on one or more computer storage devices, each configured to perform the actions of the methods.

Some implementations may include one or more of the following features. The method may further include determining a derivative of each target image, where the computed update increment is based on the determined derivative of each target image. For example, determining the derivative of each target image may include: determining pixel derivatives for pixels of each target image; calculating image gradients for each target image; and warping the image gradients using the interpolation grid. In some implementations, the method may further include: determining a subsequent interpolation grid based on the refined depth map; warping a set of target images selected from the plurality of images based on the subsequent interpolation grid, resulting in subsequent warped target images; determining a difference between each subsequent warped target image and the reference image; determining, for each subsequent warped target image, a subsequent alpha mask including per-pixel weights; computing a subsequent update increment based at least in part on the determined subsequent alpha masks; and updating the refined depth map based on the computed subsequent update increment.

Some implementations may include applying a low pass filter to the target images and/or the reference image. Some implementations may include determining and applying a gamma correction to at least one of the warped target images. Some implementations may include receiving, in a storage medium, the captured image data from an image capture device of an electronic device other than a device that is performing the warping of the images.

In some embodiments, the captured image data includes a source of error, and the alpha mask may be configured to reduce an appearance of data associated with the source of error in the estimated depth map. For example, the source of error may be at least one of a locomotion of a part of the object or a specular highlight on a part of the object. In some embodiments, warping the target images may include generating a source of error as a result of an occlusion in the target image, and the alpha mask may be weighted to reduce an appearance of data associated with the generated source of error.

Implementations of the described techniques may include hardware, a method or process, or computer software on a computer-accessible medium.

BRIEF DESCRIPTION OF THE DRAWINGS

The accompanying drawings, which form a part of the specification, illustrate various embodiments of the present inventive concepts. The drawings and description together serve to fully explain embodiments of the present disclosure.

FIG. 3 illustrates an example of formulating a 3D mesh from a point cloud.

FIGS. 7-10 depict example outputs of various operations of the method of FIG. 6.

DETAILED DESCRIPTION 3D scanning involves the capturing of data representative of a 3D object. In some situations, this data may be captured via an image capturing process, and an image or sequence of images may be processed to locate and determine a collection of points in 3D space. As discussed above, a mesh representation (e.g., a collection of vertices, edges, and faces representing a "net" of interconnected primitive/polygonal shapes, such as triangles) that defines the shape of the object in three dimensions may be generated from the collection of points.

Figure 1A:
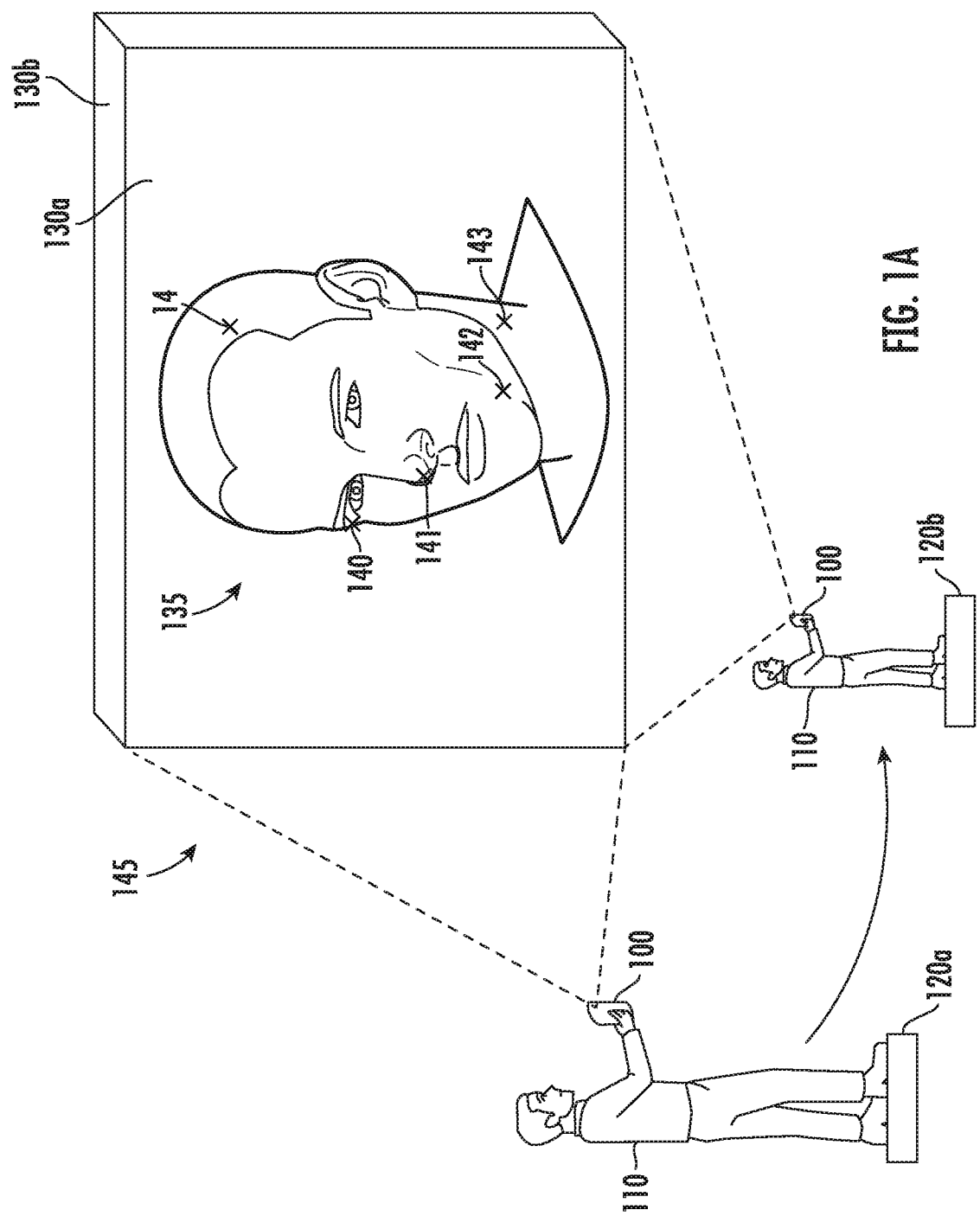
FIG. 1A is a diagram that illustrates a user capturing multiple images of an object with an electronic device, according to the present disclosure.

As part of context for the present application, FIG. 1A is a diagram that illustrates a user 110 capturing multiple images 130 of a physical object 135 with an electronic device 100, according to various embodiments of present inventive concepts. Although FIG. 1A illustrates an example in which the images 130 are captured by an image capture device 240 (FIG. 2A) at the electronic device 100, the images 130 may alternatively be captured by another device and subsequently received by the electronic device 100.

In FIG. 1A, the user 110 initiates a photographic session of the object 135, such as a head of a person or an automobile, at location 120a. The object 135 may be in a physical environment 145, which may be an interior room or an outdoor location. The user 110 may physically move in the environment 145 around the object 135 to various locations, such as from the location 120a to a different location 120b. An image 130 of the object 135 and of the environment 145 may be captured at each location. For example, image 130a is captured when the electronic device 100 is at the location 120a, and image 130b is captured when the electronic device 100 moves to the different location 120b. The captured images 130 may each be two-dimensional (2D) images, and may have a foreground part, which may largely include the object 135 and a background part which may largely include other objects or other components (e.g., walls and/or wall decorations, furniture, exterior walls, fences) in the environment 145.

The electronic device 100 may provide images 130 at various angles as the user 110 walks around the object 135. For example, the user 110 may capture images 130 around 360 degrees (or, alternatively, at least 180 degrees) of the object 135 and of the environment 145. After capturing at least two images 130, such as the images 130a and 130b, the images 130 may be processed by a processor 250 (FIG. 2A) in the electronic device 100, and/or by a processor external to the electronic device 100, to construct a preliminary digital 3D model 150 (FIG. 1B) of the physical object 135, or to otherwise generate a 3D image. The terms "construct" (or "constructing"), "generate" (or "generating"), and "build" (or "building") may be used interchangeably herein.

Processing of the images 130 may include identifying points 140-144 of the object 135 as captured in the images 130. The points 140-144 may include various edges, corners, or other points on a surface of the object 135. The points 140-144 may be recognizable locations on the physical object 135 that are tracked in various images 130 of the physical object 135. In some embodiments, constructing a preliminary 3D model 150 of the object 135 may involve capturing several (e.g., three, four, five, or more) images 130 of the object 135 and identifying tens, hundreds, or thousands of points 140-144. Locations (e.g., coordinates) of the points 140-144 may be estimated using various modeling/statistical techniques.

Figure 1B:
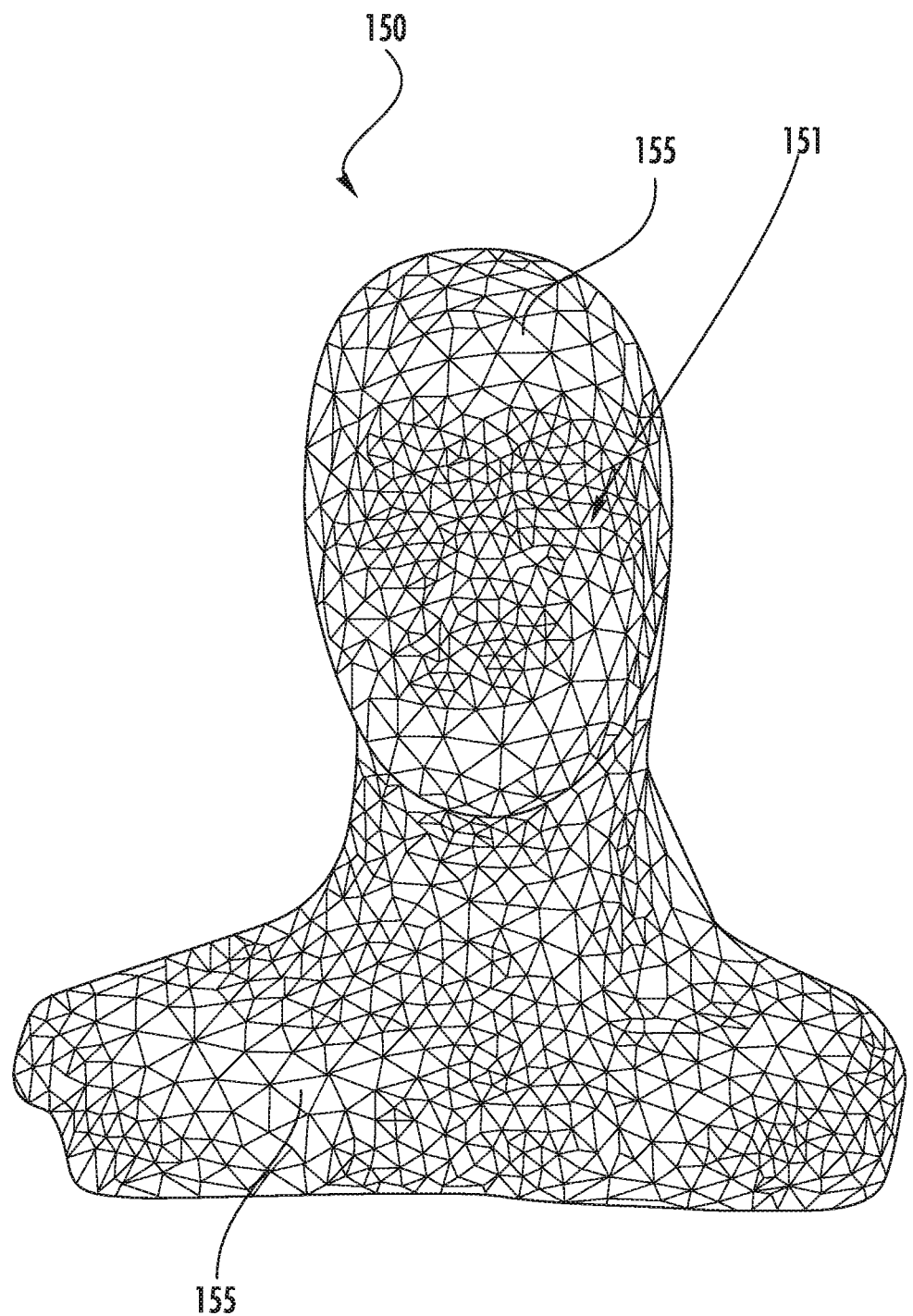
FIG. 1B is a diagram that illustrates a 3D model of an object, according to the present disclosure.

FIG. 1B is a diagram illustrating a mesh representation 150 of an object 135, according to the present disclosure. Referring to FIG. 1B, a mesh representation 150 of the object 135 may include an exterior surface 151 that includes a plurality of polygons 155. The plurality of polygons 155 may provide a representation of an exterior surface of the object 135. For example, the plurality of polygons 155 may model features, such as features at the points 140-144, on the exterior surface of the object 135. In some embodiments, the plurality of polygons 155 may include a plurality of triangles, and are referred to as such herein. Each of the plurality of polygons 155 may have one or more vertices, which may be represented by a three-dimensional coordinate (e.g., a coordinate having three data values, such as a x-value, a y-value, and a z-value). This may be referred to herein as a "3D-coordinate."

Figure 1C:
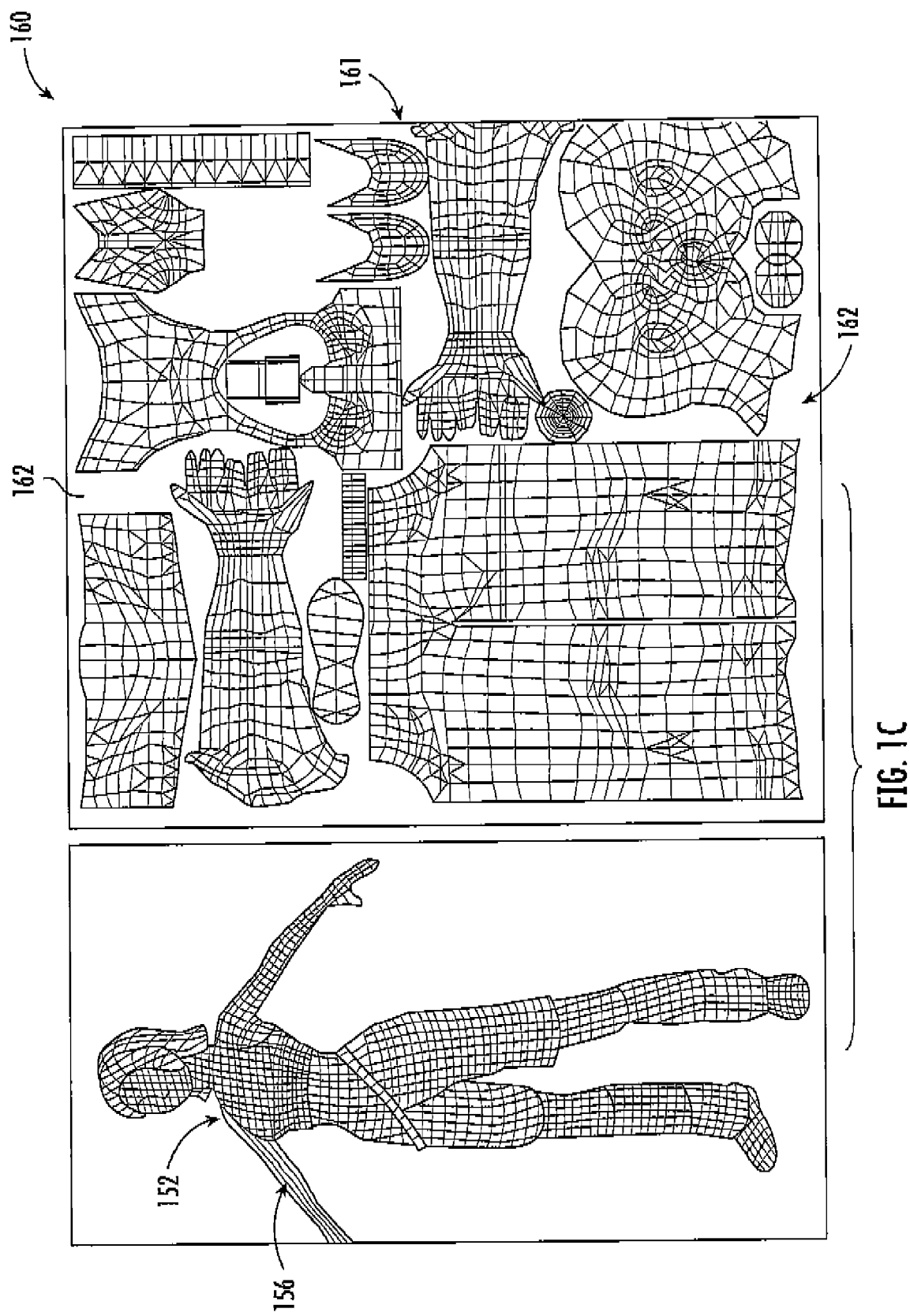
FIG. 1C is a diagram that illustrates a 3D model of an object and a texture, according to the present disclosure.

A mesh representation, such as the mesh representation 150 of FIG. 1B, is one component of a 3D model of the 3D object. In order for the virtual representation of the object to look realistic, it is desirable to add color, detail, or other texture information. This information may be stored in one or more objects or data files, such as a texture map. FIG. 1C is a diagram illustrating the relationship between a texture 160 and a mesh representation 152. Mesh representation 152 and mesh representation 150 are similar, though differ in that one is a mesh representation of a head only and the other is a mesh representation of an entire body. In addition to a three-dimensional coordinate, each vertex 156 may have a two-dimensional texture coordinate (e.g., a coordinate having two data values, such as a u-value and a v-value) indicating which part of the texture 160 corresponds to the vertex 156. The texture coordinate may be referred to herein as a "UV coordinate." A rendering engine may then apply, or sample, the texture 160 to the vertices 156, in effect "painting" each vertex, or each triangle of the mesh representation 152, with the corresponding part of the texture 160. As seen in FIG. 1C, texture 160 may have one or more islands 161, where color or other texture information associated with vertices may be located, separated by gaps 162, where color, detail, surface texture or other texture information not associated with vertices 156 may be located. In some embodiments, this may be some static color (e.g., black).

One aspect in generating a 3D model includes recognizing that the model may be presented or displayed on a two-dimensional display device (though this is not the only possible output of generating a 3D model). Computer graphics systems include algorithms to render a 3D scene or object to a 2D screen. When rendered on a display device, the mesh 150/152 may be combined in a way with the texture 160, by taking the 3D coordinate of the vertices 156 and projecting them into a screen space using a camera position and parameters. These values may be provided, for example, to a vertex shader. Each pixel from the texture 160 may be sampled using the UV coordinates. This may be performed, for example, in a fragment shader.

Figure 2A:
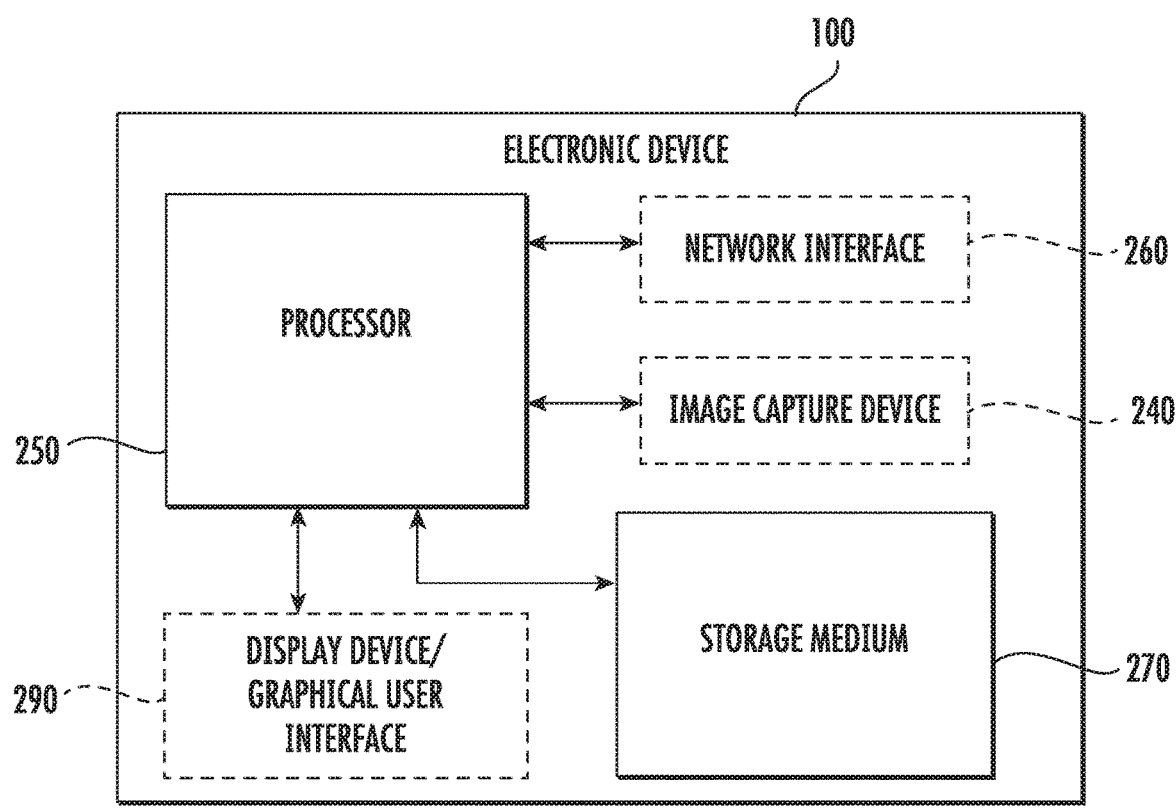
FIG. 2A is a block diagram of an electronic device of FIG. 1A, according to the present disclosure.

Referring now to FIG. 2A, a block diagram is provided of an electronic device 100 of FIG. 1A, according to the present disclosure. The electronic device 100 may include a processor 250 and a storage medium 270. Moreover, the electronic device 100 may, in some embodiments, include an image capture device 240, a network interface 260, and/or a Graphical User Interface (GUI) 290. The GUI 290 may include a display and/or a keypad or other interface that receives inputs from a user 110. In some embodiments, the GUI 290 may include a touchscreen. The image capture device 240 may be any camera or other device that captures image data of the object 135 and environment 145 that can be used to create a mesh representation 150/152 and/or a texture 160 for the 3D model. The processor 250 may be coupled to the network interface 260. The processor 250 may be configured to communicate with a device that provides image data (such as another electronic device 100) via the network interface 260.

For example, the network interface 260 may include one or more wireless interfaces (e.g., 3G/LTE, other cellular, WiFi, other short-range, etc.) and one or more physical wired interfaces (e.g., Ethernet, serial, USB interfaces, etc.).

Referring still to FIG. 2A, the storage medium 270 may be coupled to the processor 250. The storage medium 270 may also store instructions/algorithms used by the processor 250. For example, the storage medium 270 of the electronic device 100 may include one or more algorithms that create a texture 160 for a 3D model.

The electronic device 100 may, in some embodiments, include the GUI 290. For example, a user 110 may use the GUI 290 at the electronic device 100 (i) to capture, or otherwise obtain, image data with respect to the object 135 and environment 145, (ii) to create a texture 160 for the 3D model, (iii) to create the 3D model, (iv) to apply the texture 160 to the 3D model in a rendered image, and/or (v) to display data corresponding to the 3D model and/or the texture 160.

Figure 2B:
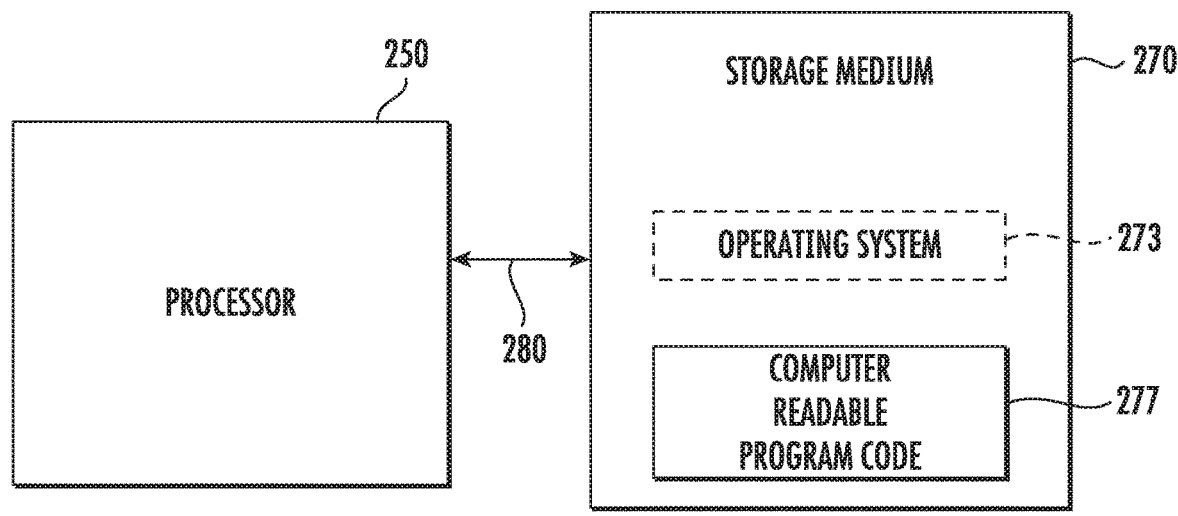
FIG. 2B is a block diagram that illustrates details of an example processor and memory that may be used in accordance with the present disclosure.

Referring now to FIG. 2B, a block diagram is provided that illustrates details of an example processor 250 and storage medium 270 of an electronic device 100 that may be used in accordance with various embodiments. The processor 250 communicates with the storage medium 270 via an address/data bus 280. The processor 250 may be, for example, a commercially available or custom microprocessor. Moreover, the processor 250 may include multiple processors. The storage medium 270 may be referred to herein as a "memory" and may be representative of the overall hierarchy of memory devices containing the software and data used to implement various functions of an electronic device 100 as described herein. The storage medium 270 may include, but is not limited to, the following types of devices: cache, ROM, PROM, EPROM, EEPROM, flash, Static RAM (SRAM), and Dynamic. RAM (DRAM).

As shown in FIG. 2B, the storage medium 270 may hold various categories of software and data, such as computer readable program code 277 and/or an operating system 273. The operating system 273 controls operations of an electronic device 100. In particular, the operating system 273 may manage the resources of an electronic device 100 and may coordinate execution of various programs by the processor 250. The computer readable program code 277, when executed by the processor 250, may cause the processor 250 to perform any of the operations illustrated in the flowcharts of FIG. 3 and FIG. 6, below.

Figure 2C:
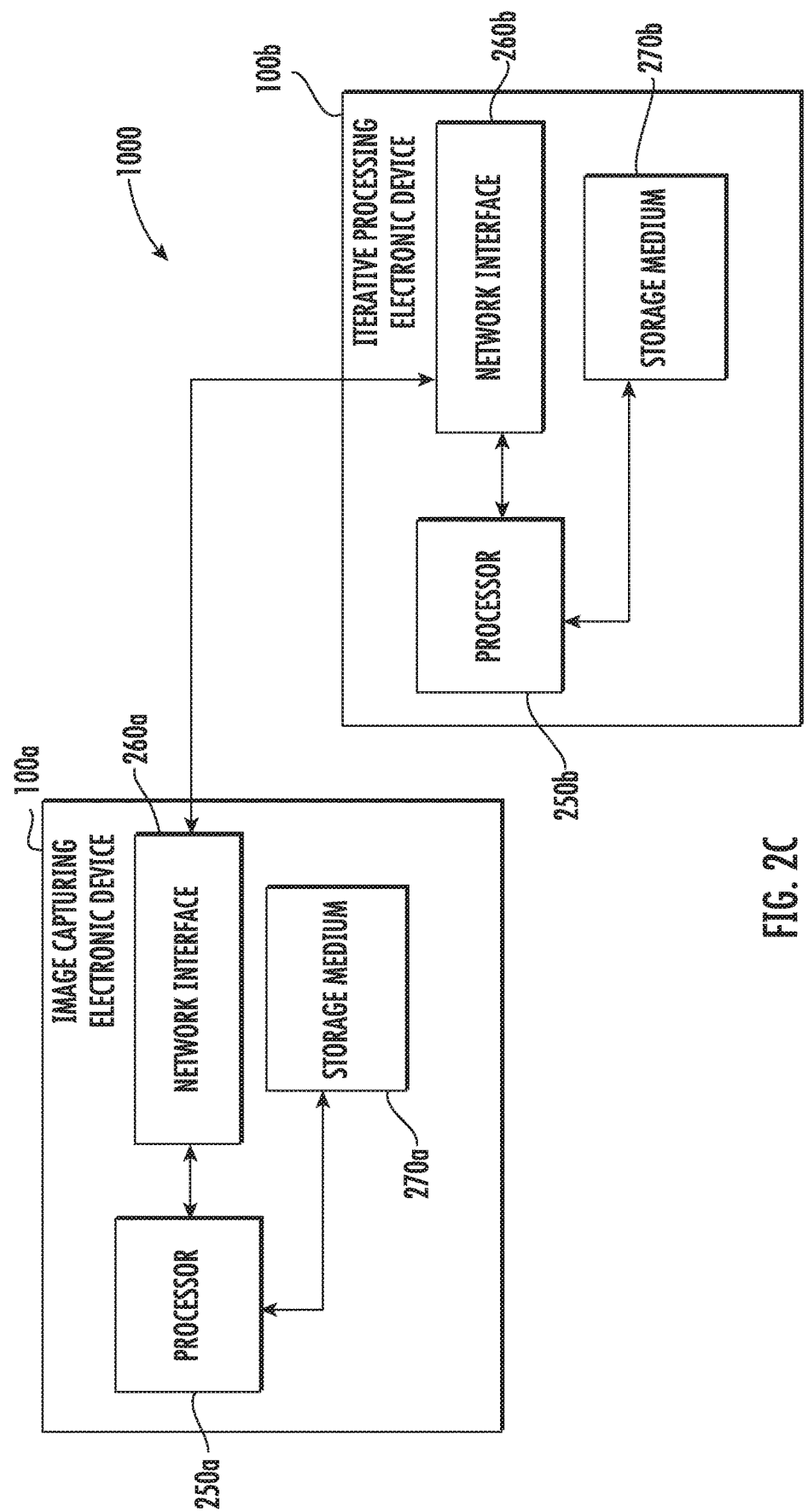
FIG. 2C is a block diagram of a system that may be used in accordance with the present disclosure.

FIG. 2C illustrates that two or more electronic devices 100a and 100b may be in communication with one another (for example, via network interfaces 260a and 260b), and may exchange information with each other unidirectionally or bidirectionally. Each electronic device 100a and 100b may include a respective processor 250 (e.g., processors 250a and 250b), a respective storage medium 270 (e.g., storage media 270a and 270b) and a respective network interface 260 (e.g., 260a and 260b) In some aspects, although only two electronic devices 100a and 100b are illustrated in FIG. 2C, more than two electronic devices 100 may be present in a system 1000. In some aspects, a first electronic device, which may be referred to herein as an image capturing electronic device 100a may be a smartphone or other computing device, via which images may be recorded (via image capture device 240, not shown in FIG. 2C). For example, as discussed above, the user 110 may initiate a photographic session of the physical object 135, such as a head of a person or an automobile, at location 120a.

The user 110 may physically move around the physical object 135 to various locations, such as from the location 120a to a different location 120b. An image 130 of the physical object 135 and of the environment 145 may be captured at each location. For example, image 130a is captured when the electronic device 100 is at the location 120a, and image 130b is captured when the electronic device 100 moves to the different location 120b. An initial mesh representation 150 of the physical object 135 may be calculated on the image capturing electronic device 100a. The initial mesh representation 150 and the images 130 may be transmitted via a network (and network interface 260a) to a second electronic device, which may be referred to herein as an iterative processing electronic device 100b (via a network interface 260b thereof). The iterative processing electronic device 100b may be a server or other computing device. Although the electronic devices 100a and 100b are illustrated as directly linked, it is within the scope of the present disclosure that the link is via one or more networks (not shown), which may be computer networks of any size and may include wired and/or wireless connections or linkages between the devices thereof.

In some aspects, the various methods provided herein may be performed on one or more of these electronic devices 100a and 100b. For example, the warping of images, calculating of the image derivatives, and/or the iterative determining of the depth map may be performed on the iterative processing electronic device 100b, or on one or more other electronic devices (e.g., one electronic device operating in conjunction with a different electronic device). The iterative processing electronic device 100b may be a device other than the image capturing electronic device 100a on which the images 130 were first captured). However, in some aspects, there may be present in system 1000 only one electronic device, and each of the operations and methods discussed herein may be performed on the singular electronic device. The operations and methods discussed herein may be components of other methods or operations.

FIG. 3 illustrates the generation of a point cloud 200 and mesh representation 400 based on a 2D image, according to various embodiments described herein. As illustrated in FIG. 3, analysis of each image (e.g., images 130a and 130b of FIG. 1) may result in the identification of points, which may collectively be referred to as point cloud 200, which is a plurality of points 200 identified from respective images of the object 135. From these identified plurality of points 200, characteristics of the mesh representation 400 of the object 135 may be updated. As described herein, the mesh representation 400 may be composed of a plurality of polygons 300 including edges 330 and vertices 320.

Respective vertices 320 of the mesh representation 400 may be associated with the surface of the object 135 being scanned and tracked. The points 200 may represent contours and/or other features of the surface of the object 135. Operations for generating a mesh representation 400 of the object 135 may attempt to map the plurality of points 200 extracted from a 2D image of the object 135 onto the polygons 300 of the mesh representation 400. It will be recognized that the mesh representation 400 is incrementally improved based on subsequent images, as the subsequent images provide additional points 200 which may be mapped to the plurality of polygons 300 of the mesh representation 400.

Refining the mesh representation 400 given a point cloud 200 may involve mathematically projecting the 3D location of the plurality of points 200 inferred from an image into and/or onto the mesh representation 400. For each point of the plurality of points 200, an analysis may be performed to determine whether the point lays on the mesh representation 400, or whether the point is off (e.g., above/below/beside in a 3D space) the mesh representation 400. If the point is on the mesh representation 400, the point may be associated with a polygon of the polygons 300 of the mesh representation 400 that contains the point. If the point is off the mesh representation 400, it may indicate the mesh representation 400 needs to be adjusted. For example, the point may indicate that the arrangement of the polygons 300 of the current mesh representation 400 is inaccurate and needs to be adjusted.

In some embodiments, to adjust the mesh representation 400, a vertex 320 of one of the polygons 300 of the mesh representation 400 may be moved to a location in 3D space corresponding to the point of the point cloud 200 being analyzed, but the present inventive concepts are not limited thereto. In some embodiments, to adjust the mesh representation 400, the polygons 300 of the mesh representation 400 may be reconfigured and/or new polygons 300 added so as to include a location in 3D space corresponding to the point of the point cloud 200 being analyzed in the surface of the mesh representation 400. In some embodiments, the adjustment of the mesh representation 400 may be weighted so that the mesh representation 400 moves toward, but not entirely to, the location in 3D space corresponding to the point of the point cloud 200 being analyzed. In this way, the mesh representation 400 may gradually move towards the points of a point cloud 200 as multiple images are scanned and multiple point clouds 200 are analyzed. Once the mesh representation 400 has been generated, it may be iteratively improved.

Figure 4:
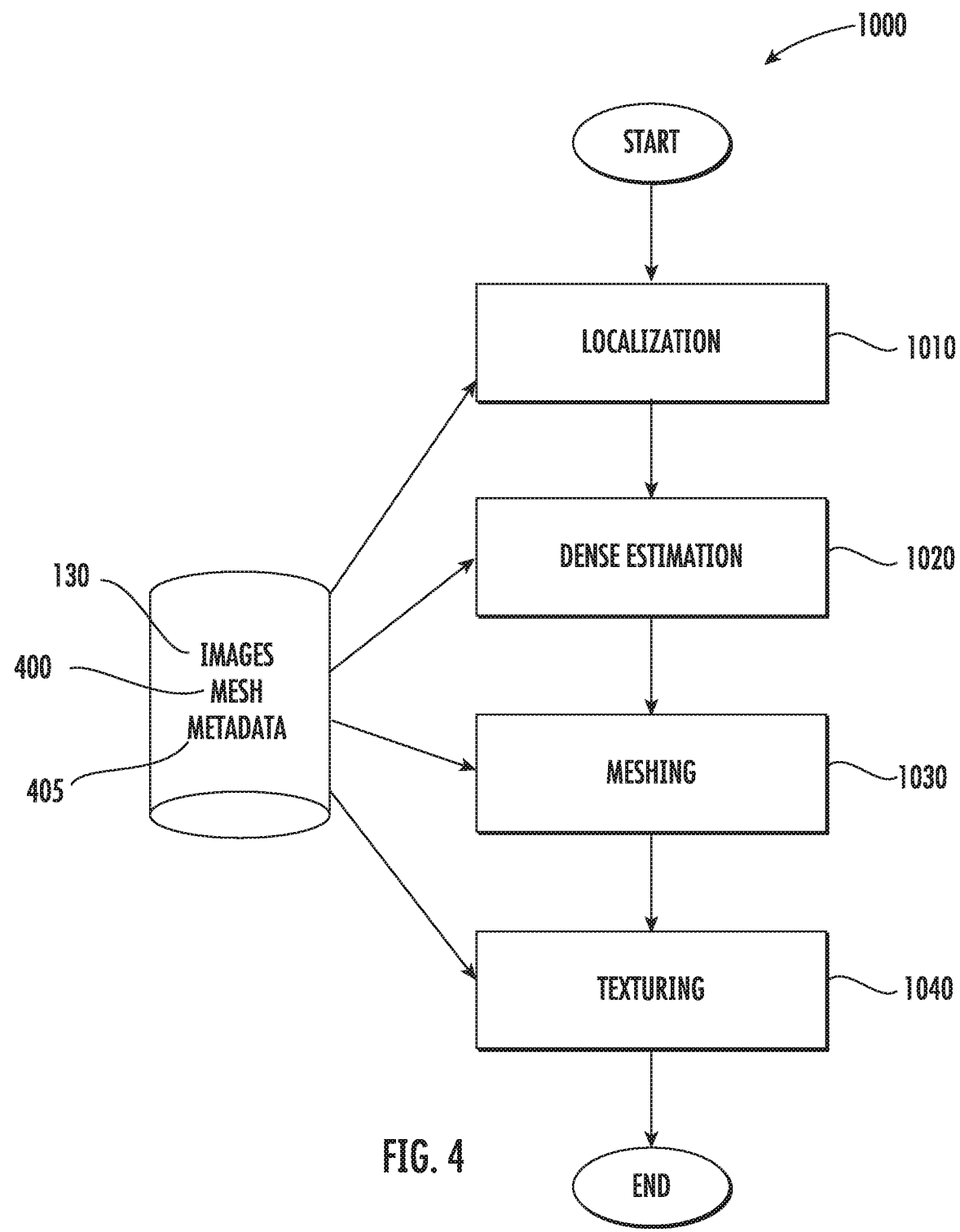
FIG. 4 is flowchart of operations for iteratively improving a 3D mesh from a series of 2D images, according to various embodiments described herein.

FIG. 4 is flowchart of operations 1000 for improving a 3D mesh representation from a series of 2D images, according to various embodiments described herein. As illustrated in FIG. 4, the process may take as input images 130, an initial mesh representation 400, and metadata.

As discussed with respect to FIG. 3, the initial mesh representation 400 may be a 3D mesh representation of a 3D object based on a series of captured images. As discussed with respect to FIG. 1, the images 130 may be particular ones of the series of captured images used to generate the mesh representation 400. The metadata 405 may include various types of information related to the images 130 and the mesh representation 400. For example, metadata 405 may include identified feature points on the mesh representation 400. In some embodiments, feature points my indicate features of an underlying image that stand out, such as high contrast areas or edges of the image. Feature points may be used to track a particular portion of an object across multiple images to help in surface and location identification. Once a feature point is seen in many images, it can be triangulated in 3D space. In some embodiments, the metadata 405 may also contain additional information related to the formulation of the mesh representation 400.

Referring to FIG. 4, the operations 1000 to improve the initial mesh representation 400 may include block 1010 for localization. In some embodiments, localization 1010 may include analysis of the mesh representation 400 and images 130 to determine if there are errors and/or other imperfections in the mesh representation 400 related to the positioning of the camera. By analyzing the mages 130, specific objects or features represented in the images 130 may be identified, and the position and orientation of the object 135 relative to some coordinate system may be determined. The combination of position and orientation may be referred to as the pose of the camera. By analyzing the initial mesh representation 300 and the pose of the camera with respect to the object 135 in the various images 130, reproduction errors in the mesh representation 400 can be identified and removed.

After localization 1010, the operations 1000 for improving the mesh representation 400 may continue with dense estimation 1020. In dense estimation 1020, individual ones of the images 130 may be analyzed and compared with adjacent images 130. As used herein, adjacent images 130 may refer to two images 130 that represent images taken of the object from physically adjacent positions in the 3D space surrounding the object. Individual images 130 may be analyzed respective to adjacent images 130 to establish an estimate of the depth of the object and/or the placement of the object within a 3D coordinate system. In some embodiments, the dense estimation 1020 may result in a generation of a point cloud for a given image 130. Upon output of the dense estimation 1020, a location in a 3D coordinate space may be known and/or determined for each point of the point cloud. In addition, for each point of the point cloud, a normal may be determined. As used herein a normal for a point is a vector that is perpendicular to a surface of theoretical plane that includes the point and is tangential to the surface of the object. Stated another way, the normal for a given point may indicate an "outward" perpendicular direction from the surface of the object at the given point.

After dense estimation 1020, the operations 1000 for improving the mesh representation 400 may continue with meshing 1030. As described herein, the analysis of the images 130 may result in a series of point clouds (see, e.g., point cloud 200 of FIG. 3). During meshing 1030, each of these points clouds may be combined to generate an improved mesh representation of the object.

Figure 5A:
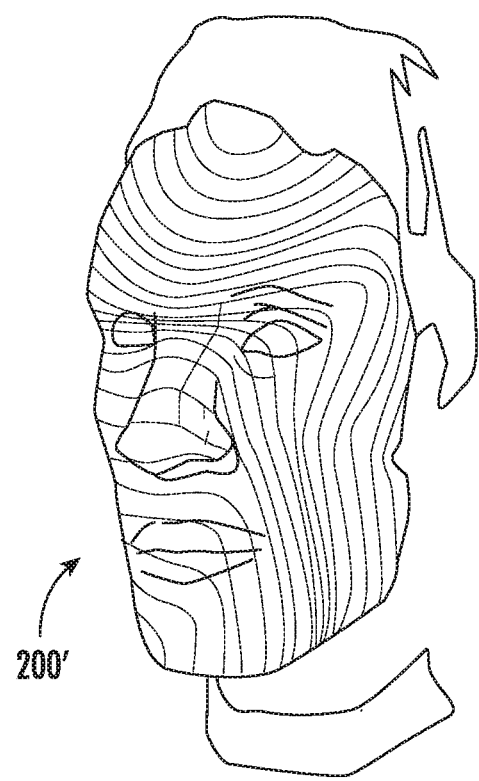
FIGS. 5A, 5B, and 5C illustrate an example of combining point clouds to generate a 3D mesh, according to various embodiments described herein.
Figure 5B:
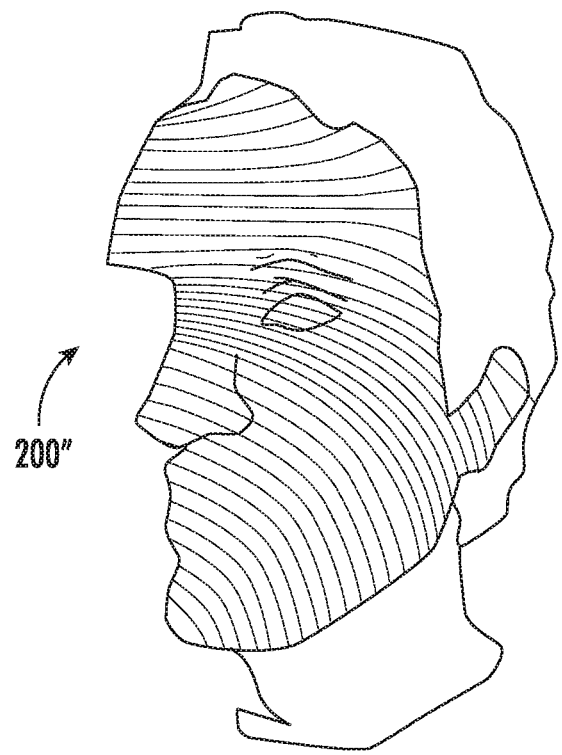
Figure 5C:
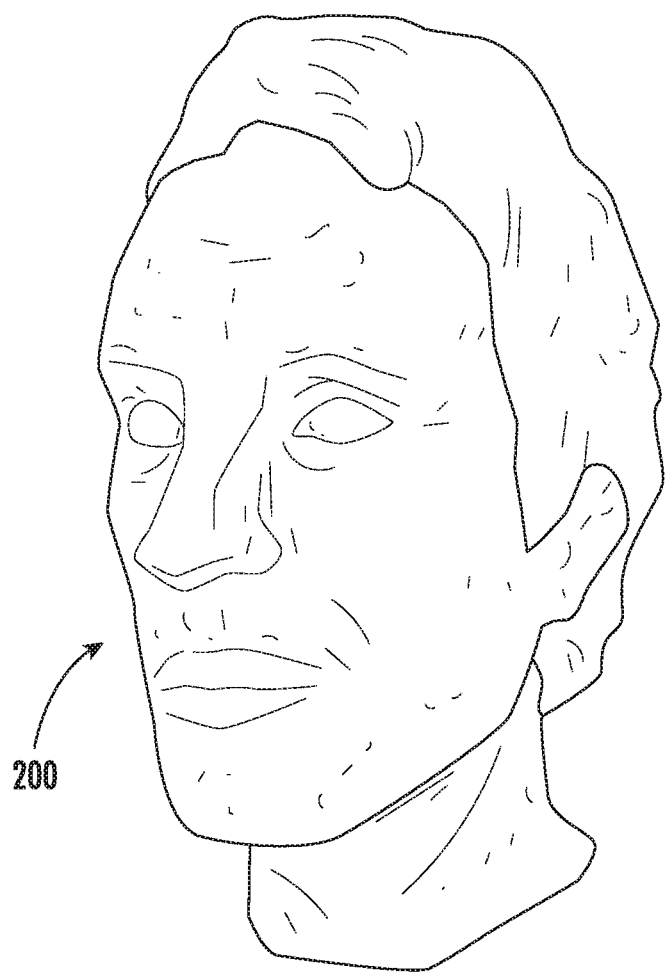

FIGS. 5A, 5B and 5C illustrate an example of combining point clouds to generate a 3D mesh representation, according to various embodiments described herein. FIG. 5A illustrates an example point cloud 200'. As described herein, the point cloud 200' may be generated based on an image 130 taken from a series of images of an object. As illustrated in FIG. 5A, the point cloud 200' may include a series of points that are associated with only a first portion of the object, in this example a portion of a face. FIG. 5B illustrates a second example point cloud 200" that includes a series of points that are associated with a second portion of the object, different from the first portion. Thus, the point clouds 200' and 200" illustrated in FIGS. 5A and 5B represent different portions of a same object based on images taken from different perspectives. The point clouds 200' and 200" may be generated from individual images 130 taken of the object from different angles. Though the point clouds 200' and 200" correspond to different perspectives of the object, it should be noted that the perspectives may overlap. That is to say that particular locations on the surface of the object represented in point cloud 200' may also be represented in point cloud 200", albeit from a different angle.

Though FIGS. 5A and 5B illustrate two point clouds 200' and 200", it will be understood that multiple point clouds 200 may be available for generation of the mesh. In some embodiments, a point cloud 200 may exist for every image 130. In some embodiments, the number of point clouds 200 may be different than the number of images 130.

As illustrated in FIG. 5C, the meshing block 1030 may include combining a plurality of the point clouds (e.g. 200' and 200") into a single point cloud 200. The combination of the plurality of the point clouds may be based on a recognition of the pose (e.g., the position and orientation) of the object being represented, the determined location of the various points of the plurality of the point clouds, and/or a recognition that individual points of different point clouds may overlap a same position on the surface of the object. By comparing the coordinates of the points of the plurality of the point clouds, a combined point cloud 200, such as the one illustrated by example in FIG. 5C, may be generated, with each point mapped into a common 3D coordinate system.

Once a common point cloud 200 is determined, a mesh representation 400 may be generated based on the point cloud 200. The purpose of the mesh generation is to develop a mesh representation 400 that most closely matches the point cloud 200 and also provides approximations of the surface of the mesh representation 400 for which there is no information (e.g., gaps in the mesh representation 400). As discussed with respect to FIG. 3, generation of the mesh representation 400 may include an analysis of the individual points of the point cloud 200 to construct a 3D surface of the mesh representation 400.

Multiple techniques exist for reconstructing a 3D surface from a series of point samples. The present application is not limited to the use of any one particular technique, and methods for surface reconstruction may be used in conjunction with the embodiments described herein without deviating from the present inventive concepts. For example, the present inventive concepts may be used with, but are not limited to, surface reconstruction algorithms including Poisson Surface Reconstruction, radial basis functions (RBF), moving least squares (MLS), multi-level partition of unity (MPU), ball-pivoting algorithm (BPA), Voronoi-based algorithms, and the like.

Figure 6:
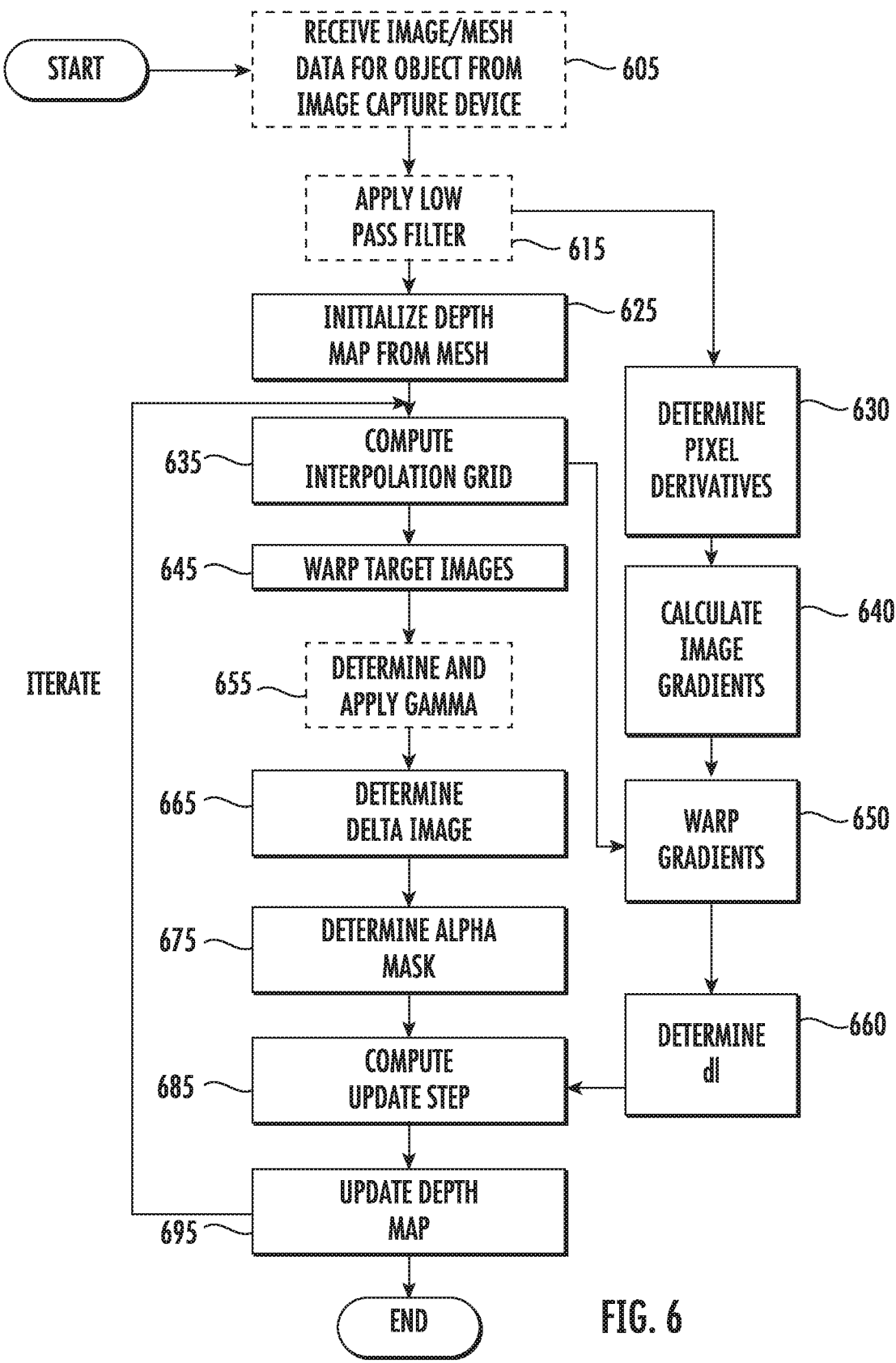
FIG. 6 is a flowchart that illustrates an example method according to the present disclosure.

As an example of the operations provided herein, FIG. 6 is a flowchart of operations for iteratively creating or improving a depth map. In some embodiments, the operations described with reference to FIG. 6 are a part of the flowchart of operations 1000 of FIG. 4, and more specifically, are a part of dense estimation operation 1020. A resultant output of dense estimation may be the creation or improvement of a depth map. A depth map may, in combination with the intrinsic and extrinsic parameters of the image capturing device 140, may be used to compute a point cloud (e.g., point cloud 200' or 200") for a given image 130. The depth map may have a pixel-wise representation (e.g., the depth map may be of the form z(u, v). Moreover, although the depth map may be represented classically (e.g., the distance between the image capture device and the object), other representations may be used, either additionally or alternatively. For example, an inverse depth map λ(u, v) may be used, a logarithmic depth may be used, and so on. Although the term "iteratively" is used herein to explain that multiple iterations of at least some of the operations of FIG. 6 may be performed more than once, it is also within the scope of the present disclosure that the number of iterations of the operations of FIG. 6 may be one. One or more electronic devices 100 may be configured to perform any of the operations in the flowchart of FIG. 6, and one or more of the operations may, in some embodiments, be performed on devices other than the image capturing device discussed above.

Referring to FIG. 6, operations for creating a depth map may include initializing a depth map (Block 625). In some aspects, this depth map may be initialized from a mesh representation of an object, although in other aspects, other data may be used instead, for example, time-of-flight, or structure light, disparity-based data, and/or other data. The mesh representation 150 constructed by the image capture device 240. In some aspects, the initialized depth map may be an inverse depth of the mesh representation constructed by the image capturing electronic device 100a. This inverse depth may be determined from a viewpoint associated with a reference image from the set of captured images 130. This association may be determined based on data indicating where in the environment the image capturing electronic device 100a was when the reference image was captured.

The set of captured images 130 may also include one or more target images, which may differ slightly from the reference image in one or more dimensions. For example, such target images may have been captured slightly before or slightly after the reference image, or may have been captured when the image capturing electronic device 100a was located at positions relatively close to the position at which the reference image was captured. Based on the initialized depth map, an initial interpolation grid may be computed (Block 635) from the images of the set of target images to see where in the reference image a pixel corresponds into the target image. Then, based on the initial interpolation grid, the one or more target images may be warped (Block 645), resulting in warped target images. This warping may modify the image data of each warped target image such that, were the warped target image viewed, it would appear to have been captured by the image capture electronic device 100a at the position where the reference image was captured.

Figure 7:
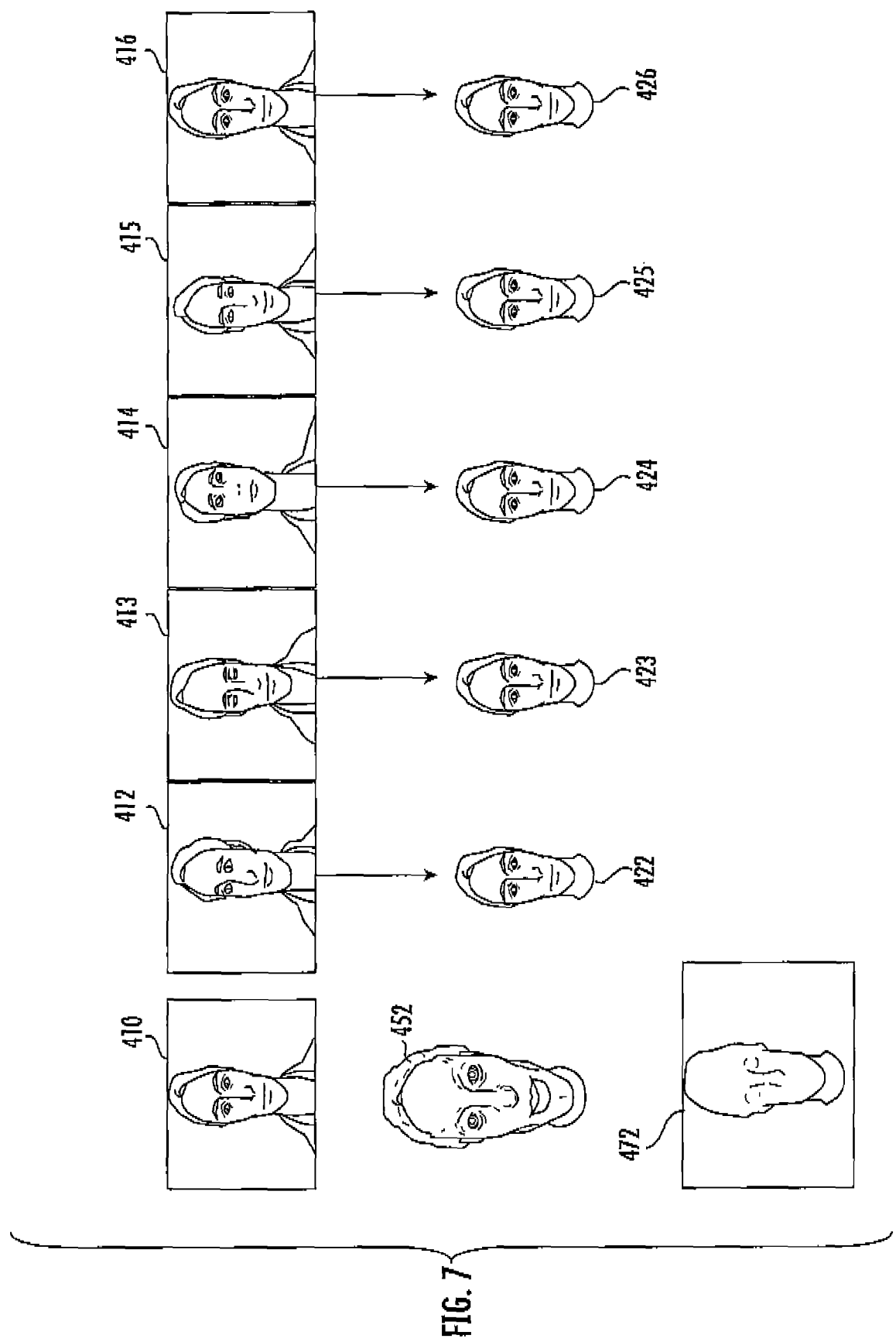

For example, FIG. 7 depicts a reference image 410, and five target images 412-416 (e.g., first target image 412, second target image 413, third target image 414, fourth target image 415, and fifth target image 416). FIG. 7 also depicts a rendering 452, and a rendering of inverse depth map 472. It may be seen that the reference image 410, rendering 452, and inverse depth map 472 each depict the subject from the same angle and distance, whereas the five target images 412-416 each depict the subject from different angles and distances than the reference image 410. Through warping using the interpolation grid based on the initialized depth map (e.g., operations corresponding to Block 645 of FIG. 6), the resultant warped images 422-426 respectively corresponding to the five target images 412-416 include data (such as features of the object 135) from each corresponding target image 412-416 as if the corresponding target image had been captured at the same angle and from approximately the same distance as the reference image 410.

Figure 8:
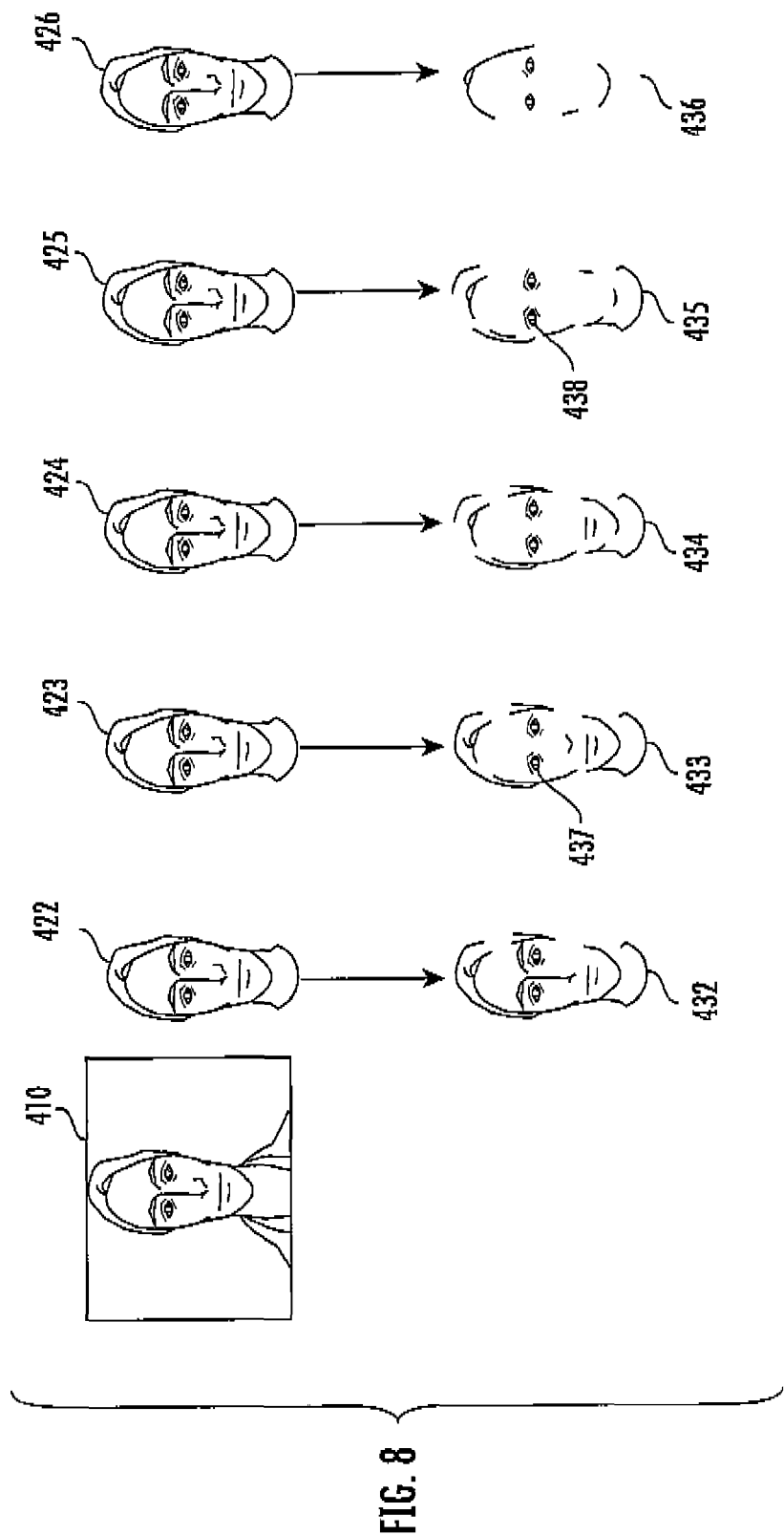

From these warped target images, differences between each warped target image and the reference image may be determined. This may be calculated as a per-pixel difference between each warped target image (e.g., warped target images 422-426) and the reference image 410 (Block 665). FIG. 8 depicts reference image 410 again, as well as warped target images 422-426, and the difference (or delta) between each warped target image 422-426 and the reference image 410. It may be seen that the delta between the warped target image 422-426 and the reference image 410 may be represented in grayscale, with no difference at a pixel being represented by gray, and differences between images being represented as white or black. As an example, the subject was in the process of blinking during the capturing of target image 413, which was warped, resulting in warped target image 423. The delta image 433 of the comparison between warped target image 423 and reference image 410 shows a source of potential error 437 that results from the blinking. Similarly, another source of potential error 438 is shown most prominently in the delta image 435, in part because the subject is looking in different directions in reference image 410 and some of the target images 412-416. Other sources of potential errors, as discussed elsewhere herein, include specular highlights or reflections, occulsions (where an image region is obscured by an object or the subject), saturated areas, and so on.

The inventors have recognized that from the delta images (e.g., delta images 432-436), multiple views of the same subject are present. In some of these images, sources of potential errors (e.g., potential error sources 437 and 438) may be present. These sources of potential error may "move" between the images (or more accurately, may be present in one image/warped image and not present, either at all or at the same location, in another image/warped image). Accordingly, an alpha mask may be determined (operations corresponding to Block 675). This alpha mask may provide a weighting of different portions or pixels of the warped image, with smaller errors (or no errors) weighted more than higher errors.

Figure 9:
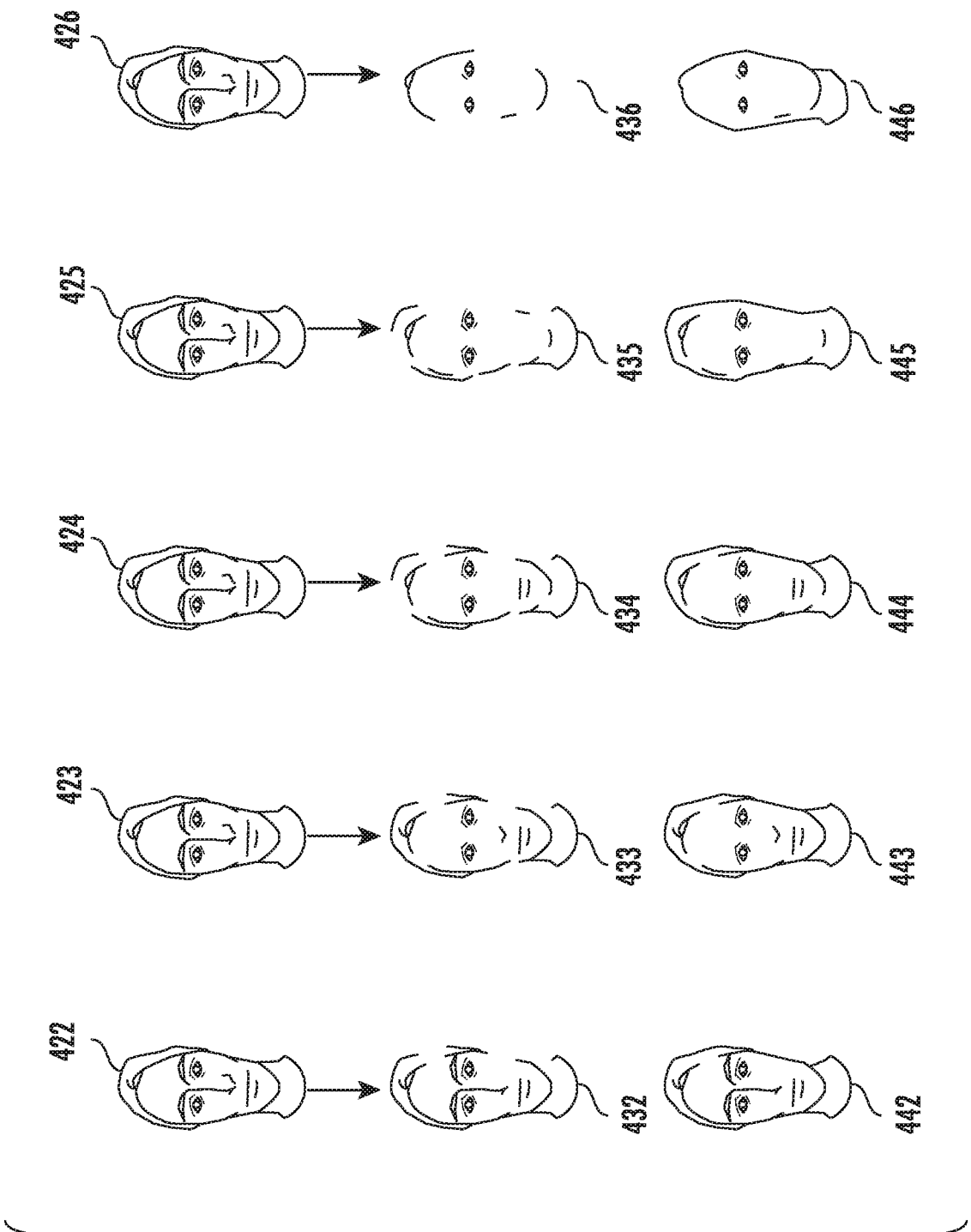

In addition to the calculation of the deltas between the reference image 410 and the one or more warped target images 422-426, the derivatives of each target image and/or each warped target image may also be calculated. First, pixel derivatives for each target image may be computed (operations corresponding to Block 630), and a gradient may be calculated for each target image (operations corresponding to Block 640). This image gradient may also be warped using the interpolation grid (discussed above) (operations corresponding to Block 650). The derivative of the image may be calculated, for example by dotting the pixel derivatives with the warped gradient of the target image (operations corresponding to Block 660). It is noted that although FIG. 6 shows the pixel derivatives as an operation occurring prior to the calculation of the image gradients and warping of the image gradients, these operations may be independent from each other and may be reversed in practice. FIG. 9 depicts computed dI's for each of the five target images 412-416, respectively shown as 442-446. For comparison, warped target images 422-426 and delta images 432-436 are also shown.

Based on the weightings (e.g., the alpha mask) and the dI, an update step or increment may be computed (operations corresponding to Block 685). This may be, for example, an increment used to update the depth map in the current iteration of the method of FIG. 6. Based on this update increment, the depth map may be updated, thereby refining the depth map (operations corresponding to Block 695).

Subsequent to the updating of the depth map, one or more of the operations discussed with reference to FIG. 6 may be performed. For example, a subsequent interpolation grid may be determined, using the updated depth map instead of the initialized depth map (e.g., operations corresponding to Block 635 may be performed one or more times). The target images and the gradients may be warped using the subsequent interpolation grid (e.g., operations corresponding to Blocks 645 and 650 may be performed one or more times). The delta image, the alpha mask, and the dI for each warped target image/warped gradient may be performed one or more times (e.g., operations corresponding to Blocks 660, 665, and 675) may be performed one or more times, and a second update increment may be computed (e.g., through performance of operations corresponding to Block 685). The process may iterate a fixed number of times, or may iterate until it is determined that further optimization is not needed or desirable. FIG. 10 depicts output after a first iteration (depth map 472 and rendering 452) and after a subsequent iteration (depth map 482 and rendering 462). It may be seen that additional detail, especially in the hair and eye regions of the subject, is present in the results of the subsequent iteration.

Mathematically, the relation between a point in space (with coordinates X, Y, Z) and image pixel coordinates (u, v) is as follows:

$$\begin{bmatrix} X \\ Y \\ Z \end{bmatrix} = R \cdot \left[ \left( K^{-1} \begin{bmatrix} u \\ v \\ 1 \end{bmatrix} \right) \cdot z(u,v) \right] + p \qquad (1)$$

In Equation (1) above, R is the camera orientation matrix, K is the camera matrix, and z is the pixel-wise representation depth map. If an inverse-depth representation is used, then the relationship is expressed as:

$$\begin{bmatrix} X \\ Y \\ Z \end{bmatrix} \cdot \lambda(u,v) = R \cdot \left[ \left( K^{-1} \begin{bmatrix} u \\ v \\ 1 \end{bmatrix} \right) \right] + p \cdot \lambda(u,v) \qquad (2)$$

In Equation (2), $\lambda(u,v)$ is the inverse depth map representation. Updating the inverse depth map (e.g., at Block 695) based on the update increment calculated (e.g. at Block 685) may be represented mathematically as:

$$\lambda(u,v) = \lambda_{prior}(u,v) + \hat{\lambda}(u,v) \qquad (3)$$

Generating the depth map 472 while avoiding areas of error may be thought of as an optimization problem, where $$F = \Sigma_w \tfrac{1}{2}(\Delta I)^2 \qquad (4)$$

is the objective function. Various operations discussed herein may have mathematical operations or calculations as components thereof. For example, the difference $\Delta I$ may be calculated (e.g., in operation Block 665) on a per-pixel basis as follows:

$$\Delta I = \frac{1}{\gamma} I_{REF}(u,v) - \gamma I_{TRG}(u',v',\lambda) \qquad (5)$$

where $\gamma$ may be an optional normalization or correction factor to account for differences in brightness between the images of the captured image set, $I_{REF}$ may be the reference image, and $I_{TRG}$ may be the target image, and u and v may be horizontal and vertical coordinates of the pixel, respectively. The update increment may be calculated (e.g., in an operation corresponding to Block 685 of FIG. 6) as follows:

$$\hat{\lambda} = \frac{\sum_{i=1}^{N} \left[ \left(\frac{dI}{d\lambda}\right)^T \Delta I \right] \cdot \alpha}{\sum_{i=1}^{N} \left[ \left(\frac{dI}{d\lambda}\right)^T \left(\frac{dI}{d\lambda}\right) + \beta \right] \cdot \alpha} \qquad (6)$$

In Equation (6) above, $\beta$ may represent a regularization used to limit the update increment. In some aspects, $\beta$ may be determined using the following equation.

$$\beta = \frac{C \cdot Z^2}{\frac{1}{N}\sum_{i=1}^{N} b_i f_i} \qquad (7)$$

Also, in Equation (6), and as discussed with respect to Block 675 of FIG. 6, outliers may be removed using an alpha mask $\alpha$, where $\sigma$ is a threshold that may be, in some aspects, approximately 0.1. This alpha mask may be calculated using the following equation (e.g., in an operation corresponding to Block 675 of FIG. 6):

$$\alpha = \frac{1}{1 + \left(\frac{\Delta I}{\sigma}\right)^2} \qquad (8)$$

In some aspects, dI of the target image may be determined (e.g., in an operation corresponding to Block 660 of FIG. 6) through a decomposition of the derivative. For example, the following operation may be used:

$$\frac{dI}{d\lambda} = -\left[ \frac{dI_{TRG}(u',v',\lambda)}{du'} \cdot \frac{du'}{d\lambda} + \frac{dI_{TRG}(u',v',\lambda)}{dv'} \cdot \frac{dv'}{d\lambda} \right] \qquad (9)$$

where $$\begin{bmatrix} \frac{du'}{d\lambda} \\ \frac{dv'}{d\lambda} \end{bmatrix} = \frac{1}{Z'} \begin{bmatrix} 1 & 0 & -\frac{X'}{Z'} \\ 0 & 1 & -\frac{Y'}{Z'} \end{bmatrix} K_{TRG} \cdot t \qquad (10)$$

In Equation 10, above, K may represent the camera matrix, and t may represent the translation vector.

Various operations may, in some embodiments, be performed before initializing the depth map from the mesh representation of the object (e.g., operations corresponding to Block 625 of FIG. 6). Such potentially optional operations are illustrated in FIG. 6 with dotted lines. These optional operations may include receiving (e.g., operations corresponding to Block 605), in a storage medium 270 (FIG. 2A), image and/or mesh data for a physical object 135 from an image capture device 240 (FIG. 2A). Receiving the image and/or mesh data may include storing image and/or mesh data in the same electronic device 100a that captured the image and/or mesh data, or to receiving the image and/or mesh data at an electronic device 100b, for example via a network interface 260 (FIG. 2A). In some embodiments, the image data may refer to photos or to frames from a video stream. The image and/or mesh data may be stored in a storage medium 270 (FIG. 2A) of an electronic device (e.g., electronic device 100a and/or electronic device 100b).

In addition to the operations discussed above, low pass filters may be applied to the target images and the reference image (e.g., operations corresponding to Block 615). This may provide a first-pass filter to remove potential noise or other artifacts from the images.

In addition to the operations discussed above, $\gamma$ may be calculated (e.g., operations corresponding to Block 655). $\gamma$ may be an optional normalization or correction factor to account for differences in brightness between the images of the captured image set. $\gamma$ may be calculated for each target image and applied thereto, or singularly and applied to each target image.

In view of the above, aspects of the present disclosure provide methods, systems, and computer devices for generating an estimated depth map. For example, one general aspect provides a method of generating a refined depth map for a 3D model of an object, based on captured image data of the object comprising a plurality of images. The method may include warping a set of target images, resulting in warped target images, wherein the set of target images is selected from the plurality of images; determining a difference between each warped target image and a reference image, wherein the reference image is from the plurality of images; determining, for each warped target image, an alpha mask comprising per-pixel weights; and updating an initialized depth map based on alpha mask, resulting in the estimated depth map.

Another general aspect provides a computer program product comprising a non-transitory computer readable storage medium comprising computer readable program code therein that when executed by a processor causes the processor to perform operations comprising: warping a set of target images, resulting in warped target images, wherein the set of target images is selected from the plurality of images; determining a difference between each warped target image and a reference image, wherein the reference image is from the plurality of images; determining, for each warped target image, an alpha mask comprising per-pixel weights; and updating an initialized depth map based on alpha mask, resulting in the estimated depth map.

In some implementations, the computer program product may include computer readable program code that causes the processor to perform further options comprising: determining a derivative of each target image. The computed update increment may be based on the determined derivative of each target image. Determining the derivative of each target image may include determining pixel derivatives for pixels of each target image; calculating image gradients for each target image; and warping the image gradients using the interpolation grid In some implementations, the set of target images may include a source of error, and the alpha mask may be configured to reduce an appearance of data associated with the potential source of error in the estimated depth map. For example, the potential source of error may be at least one of a locomotion of a part of the object or a specular highlight on a part of the object.

Another general aspect provides an electronic device that includes a processor and a storage device that is coupled to the processor and comprises computer readable program code therein that when executed by the processor causes the processor to perform operations. The operations include warping a set of target images, resulting in warped target images, wherein the set of target images is selected from the plurality of images; determining a difference between each warped target image and a reference image, wherein the reference image is from the plurality of images; determining, for each warped target image, an alpha mask comprising per-pixel weights; and updating an initialized depth map based on alpha mask, resulting in the estimated depth map. In some embodiments, the electronic device of claim 17 may be configured to perform further options comprising: determining a derivative of each target image. The computed update increment may be based on the determined derivative of each target image. Determining the derivative of each target image comprises: determining pixel derivatives for pixels of each target image; calculating image gradients for each target image; and warping the image gradients using the interpolation grid. The set of target images may include a source of error, and the alpha mask may be configured such that an appearance of data associated with the source of error in the estimated depth map is reduced.

Specific example embodiments of the present inventive concepts are described with reference to the accompanying drawings. The present inventive concepts may, however, be embodied in a variety of different forms and should not be construed as limited to the embodiments set forth herein. Rather, these embodiments are provided so that this disclosure will be thorough and complete and will fully convey the scope of the present inventive concepts to those skilled in the art. In the drawings, like designations refer to like elements. It will be understood that when an element is referred to as being "connected," "coupled," or "responsive" to another element, it can be directly connected, coupled or responsive to the other element or intervening elements may be present. Furthermore, "connected," "coupled," or "responsive" as used herein may include wirelessly connected, coupled, or responsive.

The terminology used herein is for the purpose of describing particular embodiments only and is not intended to be limiting of the present inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will also be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the present inventive concepts.

Example embodiments of the present inventive concepts may be embodied as nodes, devices, apparatuses, and methods. Accordingly, example embodiments of the present inventive concepts may be embodied in hardware and/or in software (including firmware, resident software, microcode, etc.). Furthermore, example embodiments of the present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of the present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In the specification, various embodiments of the present inventive concepts have been disclosed and, although specific terms are employed, they are used in a generic and descriptive sense only and not for purposes of limitation. Those skilled in the art will readily appreciate that many modifications are possible for the disclosed embodiments without materially departing from the teachings and advantages of the present inventive concepts. The present inventive concepts are defined by the following claims, with equivalents of the claims to be included therein.

What is claimed is:

1. A method for generating an estimated depth map for usage in constructing a three-dimensional (3D) representation of an object, based on captured image data of the object comprising a plurality of images, the method comprising:
   warping a set of target images, resulting in warped target images, wherein the set of target images is selected from the plurality of images;
   determining a difference between each warped target image and a reference image, wherein the reference image is from the plurality of images;
   determining, for each warped target image, an alpha mask comprising per-pixel weights; and
   updating an initialized depth map based on alpha mask, resulting in the estimated depth map.

2. The method of claim 1, further comprising:
   initializing the initialized depth map; and
   determining an interpolation grid based on the initialized depth map,
   wherein warping the set of target images comprises warping the set of target images based on the interpolation grid.

3. The method of claim 2, wherein the initialized depth map is based on a mesh representation of the object.

4. The method of claim 2, further comprising determining a derivative of each target image, wherein the computed update increment is based on the determined derivative of each target image.

5. The method of claim 4, wherein determining the derivative of each target image comprises:
   determining pixel derivatives for pixels of each target image;
   calculating image gradients for each target image; and
   warping the image gradients using the interpolation grid.

6. The method of claim 2, further comprising:
   determining a subsequent interpolation grid based on the estimated depth map;
   warping the set of target images based on the subsequent interpolation grid, resulting in subsequent warped target images;
   determining a difference between each subsequent warped target image and the reference image;
   determining, for each subsequent warped target image, a subsequent alpha mask comprising per-pixel weights; and
   updating the estimated depth map based on the subsequent alpha mask.

7. The method of claim 1, further comprising:
   computing an update increment based at least in part on the determined alpha masks, wherein updating the initialized depth map is based on the computed update increment.

8. The method of claim 1, further comprising applying a low pass filter to the target images and/or the reference image.

9. The method of claim 1, further comprising determining and applying a gamma correction to at least one of the warped target images.

10. The method of claim 1, further comprising:
    receiving, in a storage medium, the captured image data from an image capture device of a first electronic device; wherein the warping of the target images is performed on a second electronic device other than the first electronic device.

11. The method of claim 1, wherein the alpha mask comprises a weight configured to reduce an appearance of data associated with a source of error in the estimated depth map.

12. The method of claim 1, wherein warping the target images comprises generating a source of error as a result of an occlusion in one of the target images, and wherein the alpha mask comprises a weight configured to reduce an appearance of data associated with the generated source of error.

13. The method of claim 1, further comprising:
    determining, based on the estimated depth map, a point cloud comprising a plurality of points; and
    updating, for each point of the point cloud, a normal for each point, wherein the normal for each point is a vector perpendicular to a surface of a theoretical plane that includes the point and is tangential to the surface of the object.

14. An electronic device comprising:
    a processor; and
    a storage device that is coupled to the processor and comprises computer readable program code therein that when executed by the processor causes the processor to perform operations comprising:
- warping a set of target images, resulting in warped target images, wherein the set of target images is selected from a plurality of images of a three-dimensional (3D) object;
- determining a difference between each warped target image and a reference image, wherein the reference image is from the plurality of images;
- determining, for each warped target image, an alpha mask comprising per-pixel weights; and
- updating an initialized depth map based on alpha mask, resulting in an estimated depth map for usage in constructing a 3D representation of the object.

15. The electronic device of claim 14, wherein the storage device that is coupled to the processor comprises further computer readable program code therein that when executed by the processor causes the processor to perform further operations comprising:
- initializing the initialized depth map; and
- determining an interpolation grid based on the initialized depth map,
- wherein warping the set of target images comprises warping the set of target images based on the interpolation grid.

16. The electronic device of claim 15, wherein the initialized depth map is based on a mesh representation of the object.

17. The electronic device of claim 14, wherein the storage device that is coupled to the processor comprises further computer readable program code therein that when executed by the processor causes the processor to perform further operations comprising:
- computing an update increment based at least in part on the determined alpha masks, wherein updating the initialized depth map is based on the computed update increment.

18. A computer program product comprising:
a non-transitory computer readable storage medium comprising computer readable program code therein that when executed by a processor causes the processor to perform the operations comprising;
- warping a set of target images, resulting in warped target images, wherein the set of target images is selected from a plurality of images of a three-dimensional (3D) object;
- determining a difference between each warped target image and a reference image, wherein the reference image is from the plurality of images;
- determining, for each warped target image, an alpha mask comprising per-pixel weights; and
- updating an initialized depth map based on alpha mask, resulting in an estimated depth map for usage in constructing a 3D representation of the object.

19. The computer program product of claim 18, comprising further computer readable program code therein that when executed by a processor causes the processor to perform further operations comprising:
- initializing the initialized depth map; and
- determining an interpolation grid based on the initialized depth map,
- wherein warping the set of target images comprises warping the set of target images based on the interpolation grid.

20. The computer program product of claim 18, comprising further computer readable program code therein that when executed by a processor causes the processor to perform further operations comprising:
- computing an update increment based at least in part on the determined alpha masks, wherein updating the initialized depth map is based on the computed update increment.

* * * * *